US006692140B2

(12) United States Patent
Wu

(10) Patent No.: US 6,692,140 B2
(45) Date of Patent: Feb. 17, 2004

(54) LAMP ROD FOR MOUNTING A LAMP TO A JUNCTION BOX

(76) Inventor: Wen-Chang Wu, 235 Chung - Ho Box 8-24, Taipei (TW)

( * ) Notice: Subject to any disclaimer, the term of this patent is extended or adjusted under 35 U.S.C. 154(b) by 0 days.

(21) Appl. No.: 09/994,456

(22) Filed: Nov. 28, 2001

(65) Prior Publication Data

US 2003/0099109 A1 May 29, 2003

(51) Int. Cl.[7] ............................ B60Q 1/00; B60Q 3/00; F21V 11/00

(52) U.S. Cl. .......................... 362/370; 362/95; 362/226

(58) Field of Search ......................... 362/95 (U.S. only), 362/370 (U.S. only), 226 (U.S. only); 174/58 (U.S. only), 61 (U.S. only), 65 R (U.S. only); 439/542 (U.S. only), 543 (U.S. only), 357 (U.S. only)

(56) References Cited

U.S. PATENT DOCUMENTS 1,170,352 A * 2/1916 Sheward
5,216,203 A * 6/1993 Gower ..................... 174/65 R
5,899,556 A * 5/1999 Ogawa ....................... 362/226

* cited by examiner

*Primary Examiner*—Stephen Husar
*Assistant Examiner*—Sharon Payne

(57) ABSTRACT

A lamp rod for mounting a lamp to a junction box comprises a mounting socket penetrated through an opening in a side of the junction box and a rod inserted into an interior of the mounting socket. The mounting socket has a collar section inserted into the opening of the junction box. A bore penetrates through an interior of the collar section. A platform having a cutaway portion is formed at a front end of the mounting socket and is disposed within an inner circumference of the junction box. The rod has a plug. The plug has snap-fit holes. After the rod is inserted into the mounting socket bore, the snap fit holes of the plug are respectively engaged with the retaining spring. Therefore, by above structure, overall shipping and storage dimensions are minimized and, furthermore, convenient do-it-yourself assembly can be performed by the user.

5 Claims, 5 Drawing Sheets

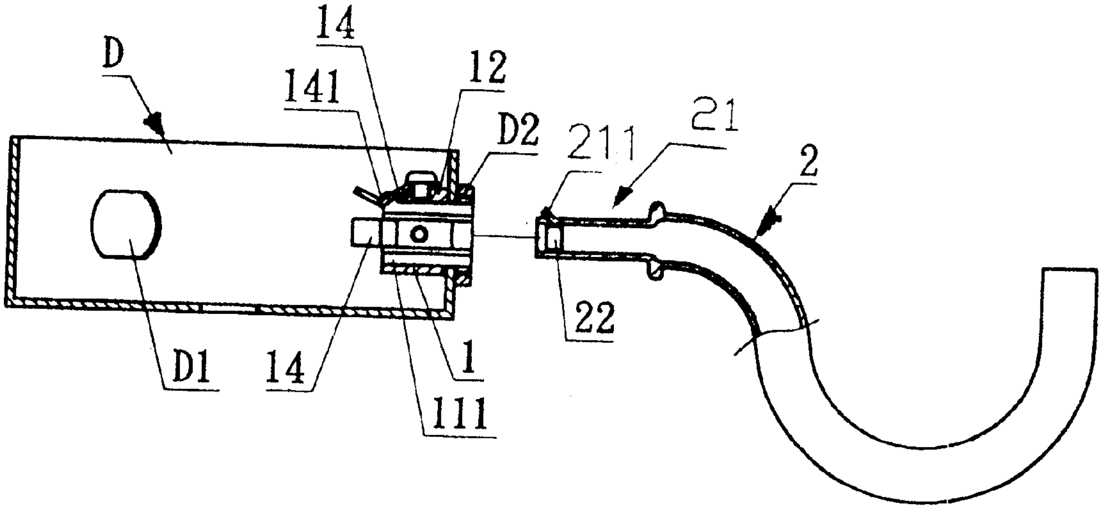
FIG3-A
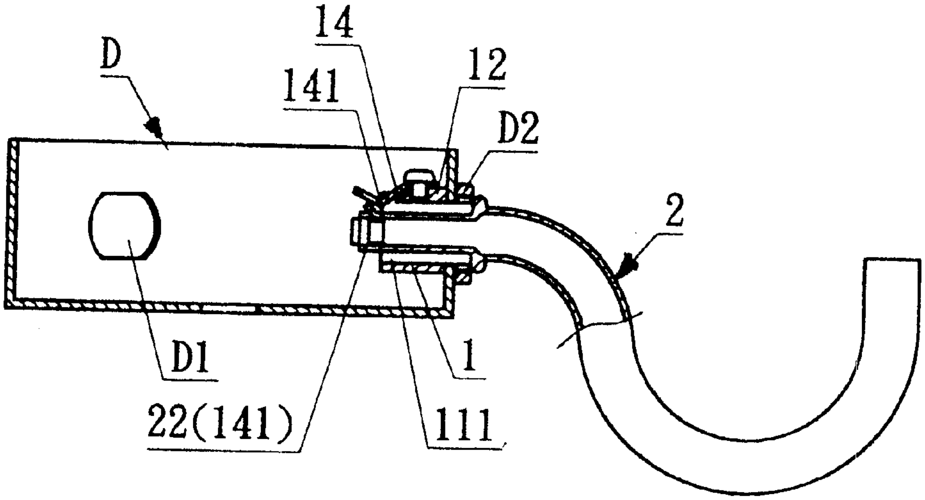
FIG3-B

LAMP ROD FOR MOUNTING A LAMP TO A JUNCTION BOX

BACKGROUND OF THE INVENTION

1) Field of the Invention

The present invention relates to lamp mounting devices, and particularly to a lamp rod for mounting a lamp to a junction box, wherein the lamp rod can be detached from the junction box.

2) Description of the Prior Art

Conventional junction box structures utilized for fixing wall lamps, table lamps, and floor lamps require screws and nuts for assembly. However, such fasteners for assembly and installation not only cause that the finished products can be damaged easily, but also some tools (such as wrenches and screwdrivers, etc.) are necessary for installation. Furthermore, it is easy to abrade the power cord and expose the wires that would cause a dangerous electrical shock. Moreover, since abovesaid defects result in some troubles that cause the user cannot perform a do-it-yourself assembly and installation. Manufacturers must finish the arrangement of the junction box and the rods before selling and must also solve the problem of excessive shipping dimensions and other factors. However, all these increase the costs.

SUMMARY OF THE INVENTION

Accordingly, the primary object of the present invention is to provide a lamp rod for mounting a lamp to a junction box, wherein the lamp rod comprising a mounting socket installed through an opening in a side of the junction box and a rod inserted into an interior of the mounting socket.

The mounting socket has a collar section. The collar section is inserted into an opening of the junction box by fastening a ring nut around an outer periphery thereof. A bore penetrates through an interior of the collar section. A platform having a cutaway portion is formed at a front end of the mounting socket and is disposed within an inner circumference of the junction box. A retaining spring is fastened onto the platform with the contact section of the retaining spring projecting through the cutaway portion and extending slightly into the interior of said mounting socket bore.

The rod has a plug. The plug has snap-fit holes. After the rod is inserted into the mounting socket bore, the snap fit holes of the plug are respectively engaged with the retaining spring.

Therefore, by above structure, overall shipping and storage dimensions are minimized and, furthermore, convenient do-it-yourself assembly can be performed by the user.

BRIEF DESCRIPTION OF THE DRAWINGS

FIG. 3-A is a cross-sectional view of the present invention which is in a normal state.

FIG. 3-B is a cross-sectional view of the present invention after the rod is inserted.

DETAILED DESCRIPTION OF THE INVENTION

Figure 1:
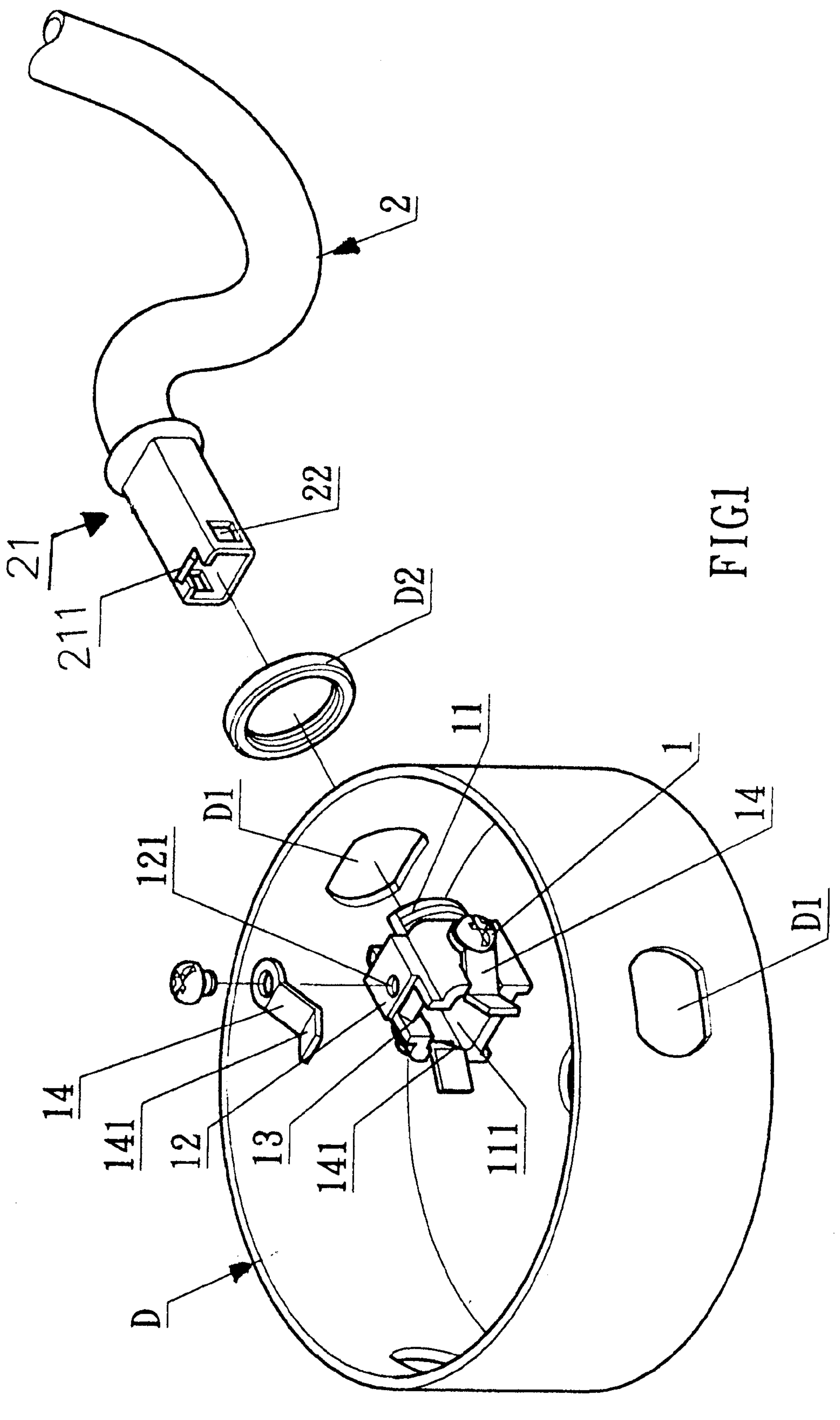
FIG. 1 is an exploded view of the present invention.
Figure 2:
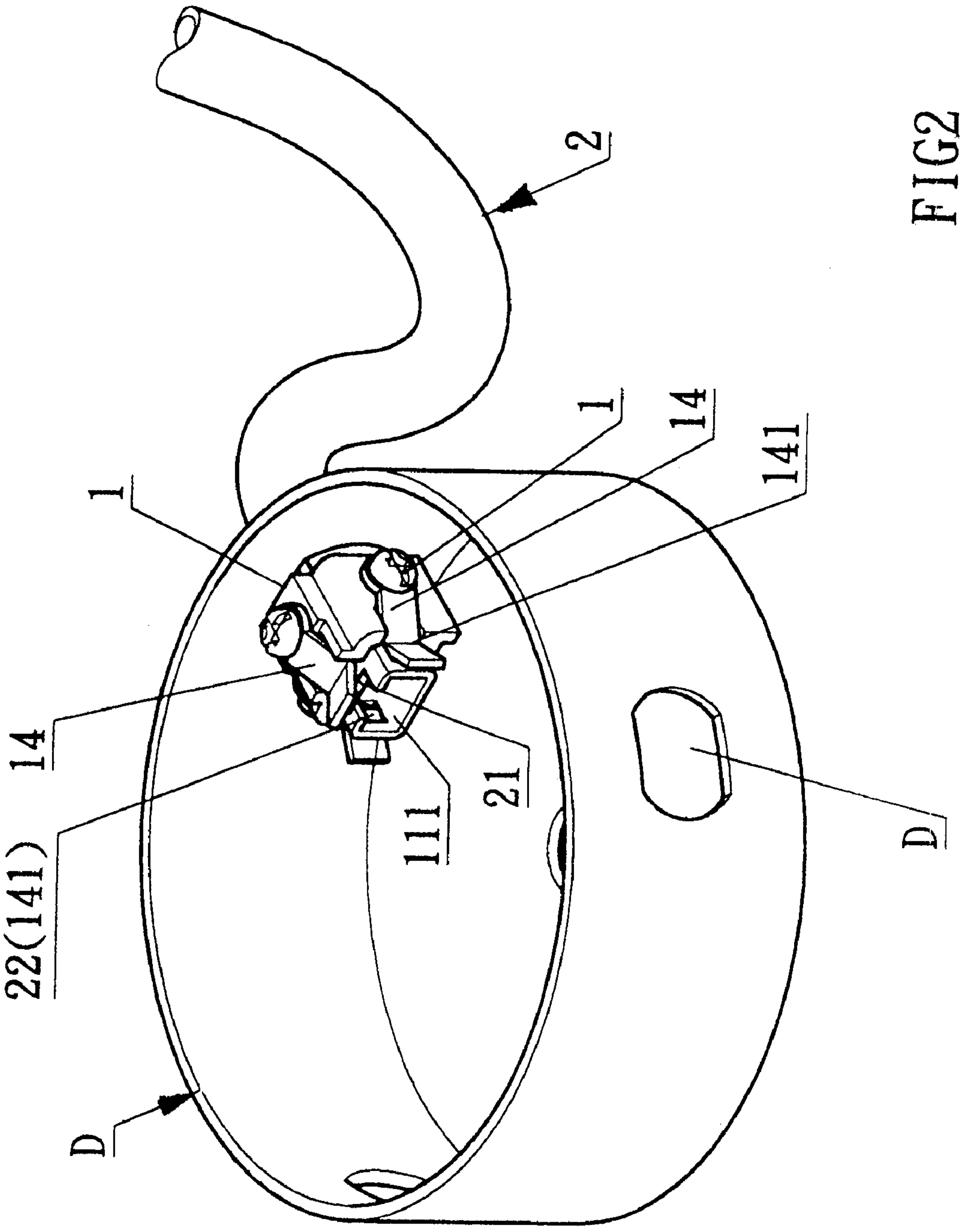
FIG. 2 is a perspective view of the present invention.

Referring to FIG. 1 and FIG. 2, the structural view of the present invention is illustrated. The present invention comprises a mounting socket 1 installed through one opening D1 at a side of a junction box D and a rod 2 is inserted into the interior sections of the mounting socket 1.

The mounting socket 1 has a laterally extending collar section 11 that is inserted into the opening D1 of the junction box D and, furthermore, a bore 111 is formed through the interior portion of the collar section 11. A ring nut D2 is arranged around the collar section 11 at a section extending out of the junction box D to install the mounting socket 1 to resist against the interior side of the junction box D.

A platform 12 having a cutaway portion 13 and arranged at the front end of the mounting socket 1 is disposed within the inner circumference of the junction box D. A hole 121 is formed in the platform 12. Furthermore, a retaining spring 14 is fastened to a hole 121. The retaining spring 14 having a curved contact section 141 is formed at the free distal end thereof such that the contact section 141 projects from the cutaway portion 13 and extends into the bore 111 of the interior portion of the mounting socket 1.

A front end of the rod 2 is disposed with a plug 21. The plug is inserted into the bores 111 of the mounting socket 1. The plug 21 has a snap-fit lip 211 protruding from a top surface thereof and a snap-fit hole 22 in each of two sides thereof such that after the rod 2 is inserted into the junction box D, the snap-fit lip 211 and the snap-fit holes 22 are respectively engaged with the contact section 141 of the retaining spring 14.

Regarding the operation of the invention herein, referring to FIG. 3, when the junction box D is in a normal state, the contact section of each retaining spring 14 extends into the interior portions of the bore 111 (as shown in FIG. 3-A).

As the rod 2 is inserted into the bore 111 of the mounting socket 1, the outer periphery of the plug 21 of the rod 2 pushes the contact section of the retaining spring 14 outwards. The rod 2 is completely inserted into the box, the snap-fit lip 211 and the snap-fit holes 22 in the two sides of the rod 2 are respectively engaged with the contact section 141 of the retaining spring 14 such that the rod 2 is fixed in position by the retaining spring 141 and cannot be pulled out (as shown in FIG. 3-B).

Figure 4:
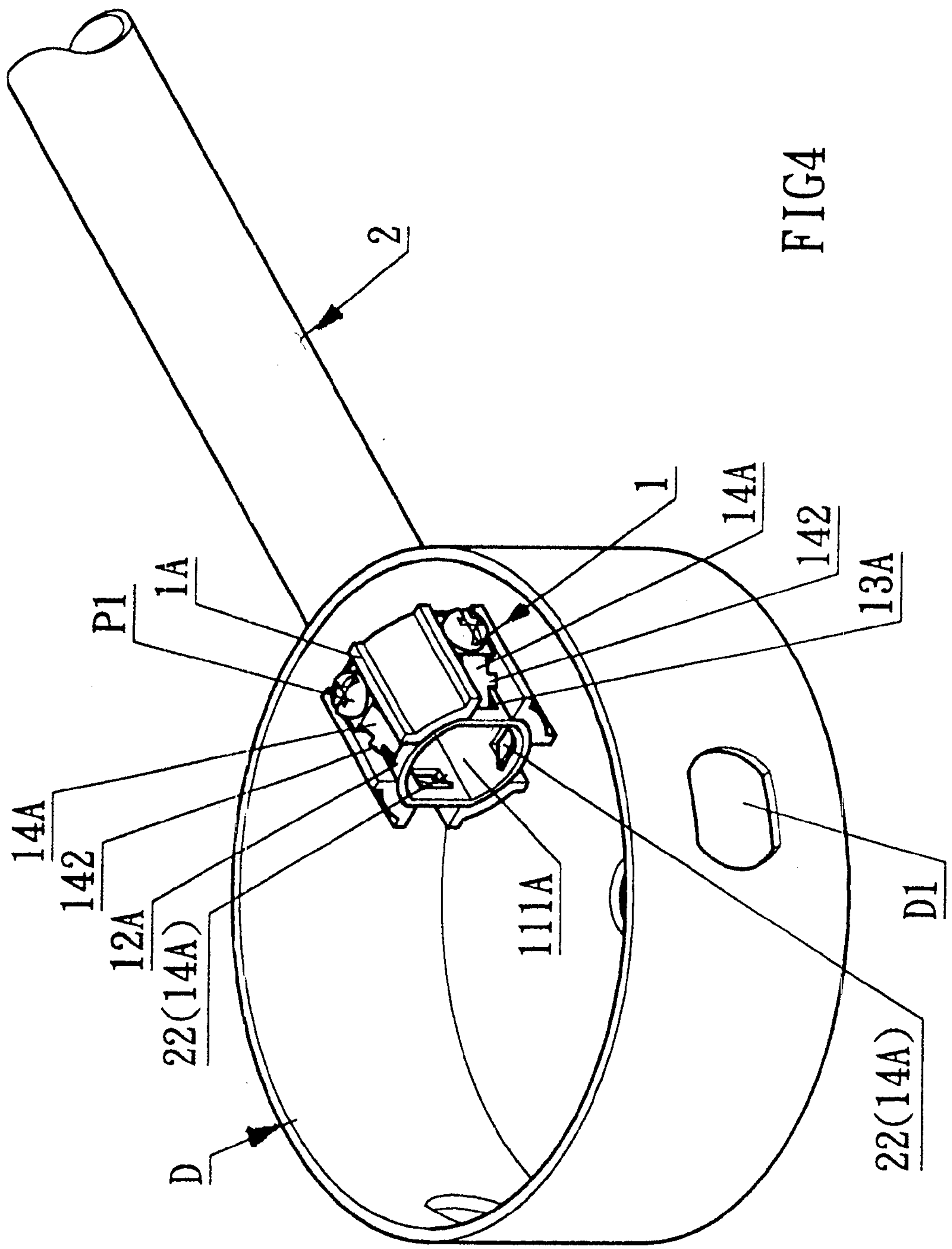
FIG. 4 is a perspective view of another embodiment of the present invention.
Figure 5:
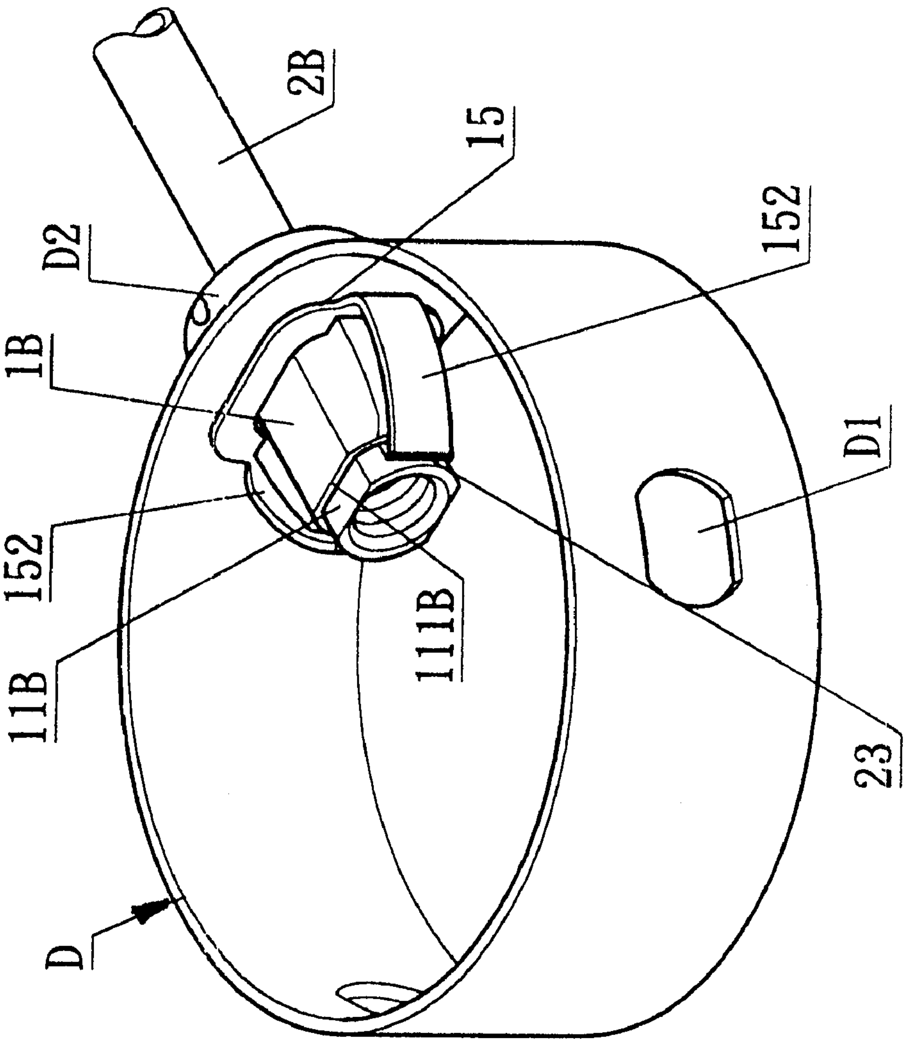
FIG. 5 shows the third embodiment of the present invention.

Referring to FIG. 4 and FIG. 5, two embodiments of the present invention is illustrated:

The mounting socket 1A in FIG. 4 has a tubular structure. The mounting socket 1A is installed within the inner circumference of the junction box D. Four platforms 12A each having a cutaway portion 13A are disposed along four sides of the front end, and each platform 12A has a retaining spring 14A fastened by a pin P1. The free distal end of each retaining spring 14A extending from the fastening point is angled such that the free distal end projects from the cutaway portion 13A and extends slightly into the interior portion of the bore 111A of the mounting socket 1A. Two check tabs 142 protrude out to fix the two sides of each retaining spring 14A. The free distal end serves to prevent the rod 2 from being withdrawn along an opposite direction, thereby securing the rod 2 in the inner side of the mounting socket 1A.

The mounting socket 1B in FIG. 5 has a collar section 11B. When the collar section 11B is inserted into the junction box D. A stay spring 15 is firstly placed against the inner circumference of the junction box D. After the collar section 11B of the mounting socket 1B has been inserted into the stay spring 15. An annular fastener D2 is screwed into the box to install the mounting socket 1B within the junction box D. The stay spring 15 has an elastomer 152 vertically extends at a certain angle from each of two sides thereof Furthermore, the distance between the free ends at the two sides of the elastomers 152 is slightly less than the width of the bore 111B of the mounting socket 1B. The rod 2B has a snap-fit slot 23 formed in each of the two sides of the plug that matches the lateral spread of the elastomers 152 such that after the rod 2B is inserted, its plug section pushes the lateral elastomers 152 away, causing the lateral elastomers 152 to enter into the snap-fit slots 23 of the rod 2B and thereby the slide-in rod 2B is secured inside the mounting socket 1B.

Since the rod 2 can be removed from the mounting sockets 1 for packaging, shipping, or storing the junction box D, the junction box D and the rods2 can be disassembled and separately arranged. This minimizes overall shipping and storing dimensions. Furthermore, since the rod 2 and mounting sockets 1 are pre-assembled to the interior section of the junction box D, users purchasing the present invention only have to insert the rod 2 into the mounting socket 1 and no additional fasteners or installation tools are required, thereby user may assembly the present invention by do-it-yourself assembly.

The bore of the collar section has a shape selected from one of a group containing triangular, rectangular, pentagonal, or other polygonal shapes.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A lamp rod for mounting a lamp to a junction box comprising:

a mounting socket penetrating through an opening in one side of the junction box; said mounting socket further comprising:

a collar section inserted into the opening of the junction box by fastening a ring nut around an outer periphery thereof;

a bore penetrating through an interior of the collar section;

a platform having a cutaway portion; the platform being formed at a front end of the mounting socket and being disposed within an inner circumference of the junction box; and a retaining spring fastened onto the platform with a contact section of the retaining spring projecting through the cutaway portion and extending into an interior of said bore; and a rod inserted into an interior of the mounting socket, the rod comprising:

a plug having snap-fit holes; after the rod being inserted into the bore, the snap fit holes of the plug being engaged with the retaining spring, respectively.

2. The lamp rod for mounting a lamp to a junction box as claim in claim 1, wherein the mounting socket has a tubular structure and has a platform with cutaway portions disposed along four sides of the front end and, furthermore, a retaining spring is fastened to the platform.

3. The lamp rod for mounting a lamp to a junction box as claim in claim 1, wherein the retaining spring is fastened to the platform of the mounting socket and has a curved contact section formed at a free distal end; furthermore, a check tab is protruded from each of two sides of the free distal end of the retaining spring that prevents the rod from being withdrawn along an opposite direction.

4. The lamp rod for mounting a lamp to a junction box as claim in claim 2, wherein the retaining spring is fastened to the platform of the mounting socket and has a curved contact section formed at a free distal end; furthermore, a check tab is protruded from each of two sides of the free distal end of the retaining spring which prevents the rod from being withdrawn along an opposite direction.

5. The lamp rod for mounting a lamp to a junction box as claim in claim 2, wherein the bore of the collar section has a shape selected from one of a group containing triangular shapes, rectangular shapes, pentagonal shapes, or other polygonal shapes.

* * * * *